United States Patent
Sancho et al.

(10) Patent No.: US 6,778,831 B1
(45) Date of Patent: Aug. 17, 2004

(54) HANDOVER DETERMINATION AND POWER CONTROL ADJUSTMENT IN MOBILE COMMUNICATIONS SYSTEMS WITH FREQUENCY HOPPING

(75) Inventors: Fernando Sancho, Madrid (ES); Juan Jose Fernandez Garcia, Madrid (ES); Roberto Zarza Garcia, Madrid (ES)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/856,546

(22) PCT Filed: Dec. 6, 1999

(86) PCT No.: PCT/EP99/09626

§ 371 (c)(1),
(2), (4) Date: Sep. 24, 2001

(87) PCT Pub. No.: WO00/35229

PCT Pub. Date: Jun. 15, 2000

(30) Foreign Application Priority Data

Dec. 10, 1998 (GB) ............................................. 9827082

(51) Int. Cl.[7] ................................................ H04Q 7/20
(52) U.S. Cl. ....................... 455/436; 455/440; 455/442; 455/452.1; 455/452.2; 375/132; 375/136; 375/138; 370/331; 370/345; 370/330
(58) Field of Search ................................. 455/434, 436, 455/435.2, 439, 424, 443, 438, 440, 447, 422.1, 522.1, 550.1, 437, 450; 375/132, 138, 136, 227, 349, 133–134; 370/331, 345, 330

(56) References Cited

U.S. PATENT DOCUMENTS

| | | | | |
|---|---|---|---|---|
| 5,224,121 A | * | 6/1993 | Schorman ................... 375/135 |
| 5,301,188 A | * | 4/1994 | Kotzin et al. ................ 370/330 |
| 5,455,962 A | * | 10/1995 | Kotzin ..................... 455/422.1 |
| 5,506,863 A | * | 4/1996 | Meidan et al. ............... 375/134 |
| 5,528,623 A | * | 6/1996 | Foster, Jr. .................... 375/133 |
| 5,594,943 A | * | 1/1997 | Balachandran ............... 455/436 |
| 5,740,166 A | * | 4/1998 | Ekemark et al. ............. 370/331 |
| 5,757,787 A | * | 5/1998 | Dent ........................... 370/330 |
| 5,774,808 A | * | 6/1998 | Sarkioja et al. ............. 455/436 |
| 5,898,682 A | * | 4/1999 | Kanai .......................... 370/331 |
| 6,021,125 A | * | 2/2000 | Sakoda et al. .............. 370/345 |
| 6,049,715 A | * | 4/2000 | Willhoff et al. ............. 455/436 |
| 6,061,389 A | * | 5/2000 | Ishifuji et al. ............... 375/133 |
| 6,161,013 A | * | 12/2000 | Anderson et al. ........... 455/437 |
| 6,229,792 B1 | * | 5/2001 | Anderson et al. ........... 370/280 |
| 6,327,471 B1 | * | 12/2001 | Song .......................... 455/440 |
| 6,405,048 B1 | * | 6/2002 | Haartsen ..................... 455/464 |
| 6,438,377 B1 | * | 8/2002 | Savolainen ................. 455/439 |
| 6,442,156 B1 | * | 8/2002 | Carlstrom ................... 370/343 |
| 6,466,794 B1 | * | 10/2002 | Posti et al. .................. 455/450 |
| 6,510,189 B1 | * | 1/2003 | Hiramatsu et al. .......... 375/349 |

* cited by examiner

Primary Examiner—William Trost
Assistant Examiner—Joseph Nguyen

(57) ABSTRACT

A device (5) for triggering a handover or for adjusting transmit power levels in a cellular communications system distinguishes between the use of a frequency hopping or a non-frequency hopping channel and sets a different threshold value depending on which type of channel is being used. In one embodiment, handover trigger levels for hopping channels are based on frame erasure rate measurements rather than bit error rate measurements thereby avoiding unnecessary handovers and advantageously reducing signaling traffic.

7 Claims, 1 Drawing Sheet

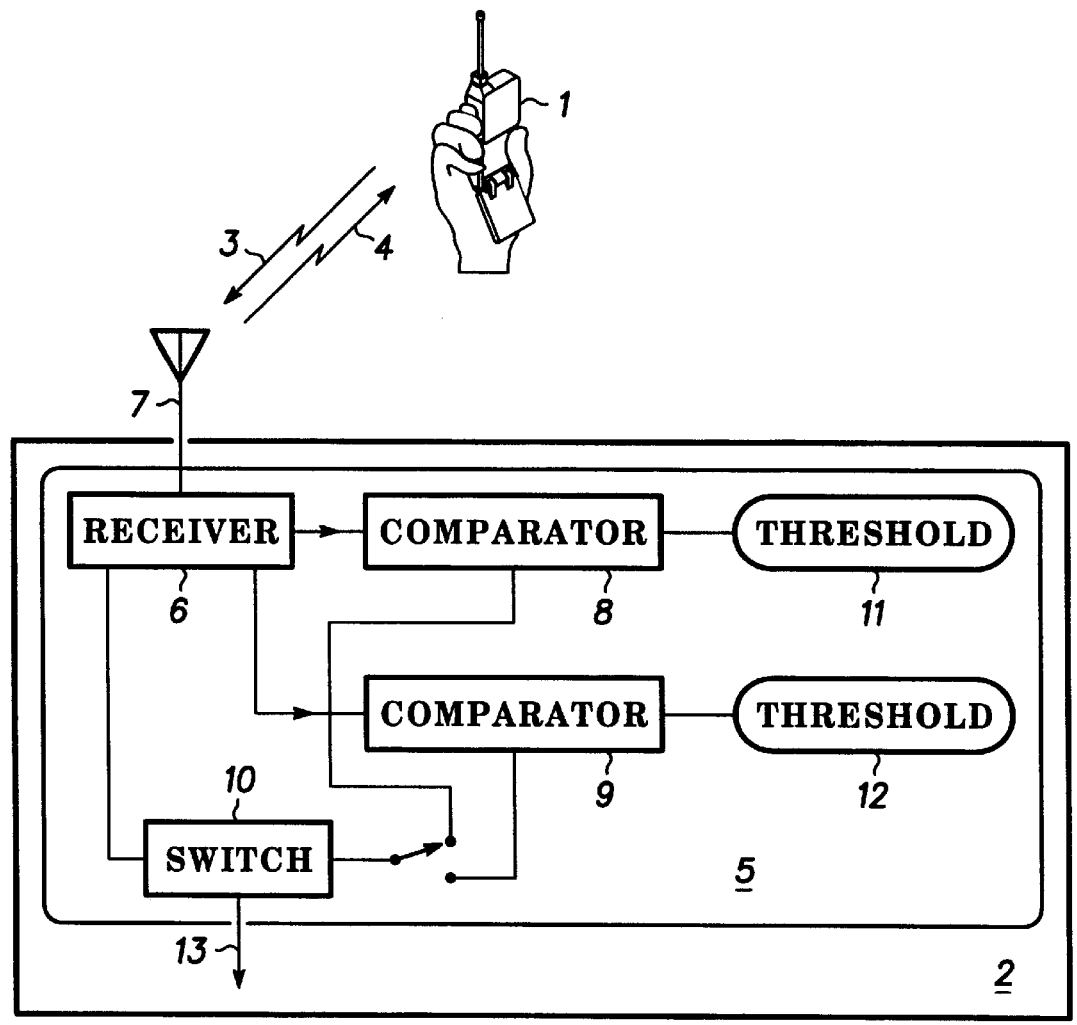

HANDOVER DETERMINATION AND POWER CONTROL ADJUSTMENT IN MOBILE COMMUNICATIONS SYSTEMS WITH FREQUENCY HOPPING

FIELD OF THE INVENTION

This invention relates to mobile communications systems and particularly to means for determining handover and for power control adjustment in such a system.

BACKGROUND OF THE INVENTION

One particular type of mobile communication system is a cellular radio telephone system. Cellular radio telephone systems generally include a switch controller coupled to the public switched telephone network (PSTN) and a plurality of base stations. One or more mobile stations communicate with a base station that facilitates a call between the mobile station and the PSTN. The communication link over a carrier signal from the base station to a mobile station is referred to as the downlink. Conversely, the communication link from a mobile station to the base station is referred to as the uplink.

Multiple access techniques permit the simultaneous transmissions from several mobile stations to a single base station over a plurality of communications channels. Some channels are used for carrying traffic e.g. voice, and others are used for transferring control information.

A particular type of cellular radio telephone system is the GSM (Global System for Mobile Communications) a description of which can be found in the book "The GSM System for Mobile Communications" by M. Mouley and M. Pautet.

GSM networks generally include mobile services switching centres, base stations and mobile stations. Each of the plurality of base stations generally defines a geographic region or "cell" proximate to the base station to produce coverage areas.

One feature of the current GSM system allows the transceivers in the base station and mobile station to adjust their power output to take into account the distance between them. The closer the mobile station is to the base station's transceiver, the less power it and the base station's transceiver will be required to transmit. This feature saves battery power in the mobile station and also helps to reduce interference effects. Both uplink and downlink power settings can be controlled independently. Initial power settings for the subscriber unit along with other control information, is set by the information provided on a broadcast control channel (BCCH) for a particular cell. The base station controls the transmit power of both the mobile station and the base station's transceiver. The received mobile station's power is monitored by the base station and the power received from the base station's transceiver at the mobile station is monitored by the mobile station and then reported to the base station. Using these measurements the power of both the mobile station and the base station's transceiver can be adjusted accordingly.

As the mobile station moves from one cell to the next, the communication link is transferred from its current base station to a neighbouring base station using a procedure known as handover or handoff. The need for handover is usually determined on the basis of one or more criteria. One of the most commonly used criteria in a GSM system is the quality measure, the so-called RxQual, which is a measure of the bit error rate (BER). BER is calculated before de-interleaving and decoding processes, which are mechanisms to combat or correct errors in the received signal. Frame erasure rate (FER) is an indicator that measures the quality perceived by the subscriber and must be calculated after decoding and deinterleaving RxQual, i.e. BER, is the metric of quality, used to trigger the quality handovers and increase the power.

Frequency hopping is another GSM feature that allows a network operator to use a set of frequencies during a call instead of using only one. The use of a number of frequencies makes de-interleaving and decoding processes more robust and efficient against transmission errors because of the ability of frequency hopping to temporally spread the corrupted bits caused by interference and fading. In other words, signals received with the same BER result in a better FER for the hopping case. So, calls allocated on hopping time slots experience better final quality (perceived by the subscriber), than those on non-hopping channels.

The situation is that, for hopping, instead of the BER (RxQual), the better measure of the quality is the FER, measured after the decoding and de-interleaving processes. In currently employed systems, a unique quality threshold is used to trigger either the handover or the power control. I.e. the same handover criterion is used for both hopping and non-hopping communication channels.

The case most frequently found, is a system working with a fixed frequency plan and with the quality threshold optimised to the appropriate value according to the quality level tolerated before a handover or power increase is made. In this situation, if frequency hopping is implemented, some of the carriers (non-BCCH ones) are equipped with frequency hopping and some others (BCCH) are not. So both types of carriers co-exist in the same cell. The appropriate value for the threshold set for the non-hopping calls triggers handovers and power increases when necessary, whereas for hopping calls, they are triggered before the quality degradation requires it. Particularly, an increase in the number of handovers is noticed after frequency hopping implementation because a lot of unnecessary handovers are performed. If however, the quality thresholds are set to an appropriate value to trigger handovers and power adjustments when necessary for the hopping calls, cases of bad quality are noticed for non-hopping calls before reaching these thresholds.

SUMMARY OF THE INVENTION

According to a first aspect of the present invention, a system for determining handover in a mobile communications network comprises;

means for establishing communication between a mobile station and a base station over a communications channel, means for determining whether the communications channel is a frequency hopping channel or a non-frequency channel, means for monitoring a quality parameter of a signal received over the communications channel, a first comparator for comparing the monitored quality parameter with a first threshold thereby generating a first trigger signal when the first threshold is exceeded, a second comparator for comparing the monitored quality parameter with a second threshold, thereby generating a second trigger signal when the second threshold is exceeded, and selector means, operably coupled to the determining means, for selecting the first trigger signal when the said channel is a non-frequency hopping channel, and the second trigger signal when said channel is a frequency hopping channel, thereby to trigger a handover.

The monitored quality parameter may, conveniently, be the BER of the received signal. The thresholds for the non-hopping and hopping cases are set to their optimum values by trial and error. This first aspect of the invention is applicable to instances where only a single quality measurement (eg BER) is available.

A second aspect of the invention is applicable when two distinct quality measurements are available.

According to a second aspect of the present invention a system for determining handover in a mobile communications network comprises;

means for establishing communication between a mobile station and a base station over a communications channel, means for determining whether the communications channel is a frequency hopping channel or a non-frequency hopping channel, means for monitoring a first quality parameter of a signal received over the communications channel, means for monitoring a second quality parameter a signal received over the communications channel, a first comparator for comparing the first quality parameter with a first threshold thereby generating a first trigger signal when the first threshold is exceeded, a second comparator for comparing the second quality parameter with a second threshold, thereby generating a second trigger signal when the second threshold is exceeded, and selector means, operably coupled to the determining means, for selecting the first trigger signal when the said channel is a non-frequency hopping channel, and the second trigger signal when said channel is a frequency hopping channel, thereby to trigger a handover.

The above principle of the present invention can also be applied to power control adjustment, with the output of the selector means being used to adjust the transmit power level depending upon whether the channel being used is a non-hopping or hopping one.

The first quality parameter may be the BER and the second quality parameter may be the FER of the received signal.

The system may be incorporated in the mobile station or the base station or both.

The advantages of using two different thresholds are achieved because of the different behaviour of the call according to perceived voice quality for the hopping and non-hopping cases. The improvements are as follows.

The two situations (hopping and non-hopping channels) are handled in the most appropriate way with both thresholds being set up separately to their optimum value, thus better equating to perceived quality.

The selection of a compromised threshold value, which is non-optimum for either situation, is avoided.

Bad quality situations arising on non-hopping channels before a handover or a power increase (i.e. when the threshold is optimised for a hopping channel) are eliminated. The overall voice quality on the network will increase.

Unnecessary handovers and unnecessary power increases (when the threshold is optimised for a non-hopping channel) are avoided. Therefore, there will be a reduction of signalling traffic and interference as well as an increase on battery life of the mobile station.

The reduction of handover failure rate leads favorably to a decrease in the dropped call rate. Furthermore, the decrease in the number of handovers per call whilst improving the performance, eliminates unnecessary handovers.

BRIEF DESCRIPTION OF THE DRAWING

Some embodiments of the invention will now be described, by way of example only, with reference to the drawing which is a schematic block diagram of a handover and power control device in accordance with the invention and incorporated in a mobile cellular network.

DETAILED DESCRIPTION OF PREFERRED EMBODIMENTS

A mobile station 1 communicates with a base station 2 in the known manner. In particular, uplink signals 3 include a measurement of the signal quality e.g. BER received by the mobile station 1 from the base station 2 over a downlink 4. The base station 2 includes, in addition to its usual constituents, a handover determining device 5 in accordance with the invention. The device 5 comprises a receiver 6 connected to an antenna 7. A first output of the receiver 6 is connected to a first input of a first comparator 8. A second output of the receiver 6 is connected to a first input of a second comparator 9. A third output of the receiver 6 is connected to a switch 10. Second inputs of each comparator 8 and 9 are connected respectively to first (non-hopping) and second (hopping) stored thresholds 11 and 12. The switch 10 is arranged to select between outputs of the two comparators 8 and 9 thereby outputting a handover trigger signal on line 13.

In operation, the receiver 6 is adapted to monitor BER from the signal received from the mobile station 1 and to output the monitored value to the comparators 8 and 9 respectively. The receiver 6 also outputs a signal to the switch 10 identifying whether the communications channel being used is a non-frequency hopping or a frequency hopping channel. The first comparator 8 compares the BER with a first stored threshold value 11 and when this value is exceeded, it generates a first handover trigger signal at its output.

The second comparator 9 compares the monitored BER with a second stored threshold value 12 and when this value is exceeded, it generates a second handover trigger signal at its respective output.

If the channel being used as a non-hopping channel, then the switch 10 selects the output from the first comparator 8 for outputting on line 13. If the channel being used is a hopping channel, then the switch 10 selects the output from the second comparator 9 for outputting on line 13.

In a second embodiment, the receiver is adapted to monitor both BER and FER of the received signal. In this case, the BER measurement is compared with the first threshold and the FER measurement is compared with the second threshold.

In an alternative embodiment, the device of FIG. 1 is used for adjusting a transmit power level by using the output of the switch 10 on line 13 to control a conventional power adjustment circuit (not shown).

We claim:

1. A system for determining handover in a mobile communications network, the system comprising;

means (7) for establishing communication between a mobile station (1) and a base (2) station over a communications channel, means (6) for determining whether the communications channel is a frequency hopping channel or a non-frequency hopping channel, means (6) for monitoring a first quality parameter of a signal received over the communications channel, means (6) for monitoring a second quality parameter of a signal received over the communications channel, a first (8) comparator for comparing the first quality parameter with a first threshold, thereby generating a first trigger signal when the first threshold is exceeded, a second comparator (9) for comparing the second quality parameter with a second threshold, thereby generating a second trigger signal when the second threshold is exceeded, and selector means (10), operably coupled to the determining means (6) for selecting the first trigger signal when said channel is a non-frequency hopping channel, and the second trigger signal when said channel is a frequency hopping channel, thereby to trigger a handover.

2. A system according to claim 1 in which the first quality parameter is the bit error rate (BER) and the second quality parameter is the frame erasure rate (FER) of the received signal.

3. A system for adjusting transmit power level in a mobile communications network, the system comprising;

means (7) for establishing communication between a mobile station (1) and a base station (2) over a communications channel, means (6) for determining whether the communications channel is a frequency hopping channel or a non-frequency hopping channel, means (6) for monitoring the quality parameter of a signal received over the communications channel, a first comparator (8) for comparing the quality parameter with a first threshold, thereby generating a first trigger signal when the first threshold is exceeded, a second comparator (9) for comparing the quality parameter with a second threshold, thereby generating a second trigger signal when the second threshold is exceeded, and selector means (10), operably coupled to the determining means for selecting the first trigger signal when said channel is a non-frequency hopping channel, and the second trigger signal when said channel is a frequency hopping channel, thereby to set transmit power level.

4. A method for determining handover in a mobile communications network, the method including the steps of;

establishing communication between a mobile station (1) and a base station (2) over a communications channel, determining whether the communications channel is a frequency hopping or a non-frequency hopping channel, monitoring a first quality parameter of a signal received over the communications channel, monitoring a second quality parameter of a signal received over the communications channel, comparing the first quality parameter with a first threshold, thereby generating a first trigger signal when the first threshold is exceeded, comparing the second quality parameter with a second threshold, thereby generating a second trigger signal when the second threshold is exceeded, and selecting the first trigger signal when said channel is a non-frequency hopping channel and the second trigger signal when said channel is a frequency hopping channel.

5. A method according to claim 4 in which the first quality parameter is the bit error rate (BER) and the second quality parameter is the frame erasure rate (FER) of the received signal.

6. A method for setting transmit power level in a mobile communications network, the method including the steps of;

establishing communication between a mobile station (1) and a base station (2) over a communications channel, determining whether the communications channel is a frequency hopping or a non-frequency hopping channel, monitoring a first quality parameter of a signal received over the communications channel, monitoring a second quality parameter of a signal received over the communications channel, comparing the first quality parameter with a first threshold, thereby generating a first trigger signal when the first threshold is exceeded, comparing the second quality parameter with a second threshold, thereby generating a second trigger signal when the second threshold is exceeded, and selecting the first trigger signal when said channel is a non-frequency hopping channel and the second triggers signal when said channel is a frequency hopping channel.

7. A method according to claim 6 in which the first quality parameter is the bit error rate (BER) and the second quality parameter is the frame erasure rate (FER) of the received signal.

* * * * *